United States Patent [19]

Sygnator

[11] 3,992,740
[45] Nov. 23, 1976

[54] SCREW BLANK RECEIVING AND ORIENTING COLLET

[75] Inventor: Henry Anton Sygnator, Arlington Heights, Ill.

[73] Assignee: Illinois Tool Works Inc., Chicago, Ill.

[22] Filed: Sept. 29, 1975

[21] Appl. No.: 617,464

[52] U.S. Cl. .................................... 10/2; 10/9; 10/21; 10/107 R; 10/162 A
[51] Int. Cl.² .................... B23G 9/00; B23G 11/00
[58] Field of Search ............... 10/2, 4, 9, 20.5, 21, 10/31, 59, 107 R, 162 A; 269/287, 288

[56] References Cited
UNITED STATES PATENTS

| 668,180 | 2/1901 | Haskins | 10/162 A |
| 1,486,467 | 3/1924 | Spitzfaden | 10/107 R |
| 3,164,851 | 1/1965 | Hanneman | 10/2 |
| 3,280,412 | 10/1966 | Hanneman et al. | 10/2 |
| 3,760,443 | 9/1973 | Jackson | 10/162 A |

FOREIGN PATENTS OR APPLICATIONS 358,310    12/1961    Switzerland ................... 10/107 R Primary Examiner—C.W. Lanham
Assistant Examiner—E. M. Combs
Attorney, Agent, or Firm—Robert W. Beart; Thomas W. Buckman

[57] ABSTRACT

A collet-type device for orienting a screw blank relative to wings previously formed on the shank of the blank so that subsequent operations, such as the formation of cutting edges and flutes, can be performed on the shank between the wings. Blank rotating cam surfaces are located in the bore of the collet intermediate a large upper diameter portion and a smaller lower diameter portion to automatically align the wings with longitudinal slots in the lower diameter portion as the blank is inserted in the collet.

9 Claims, 12 Drawing Figures

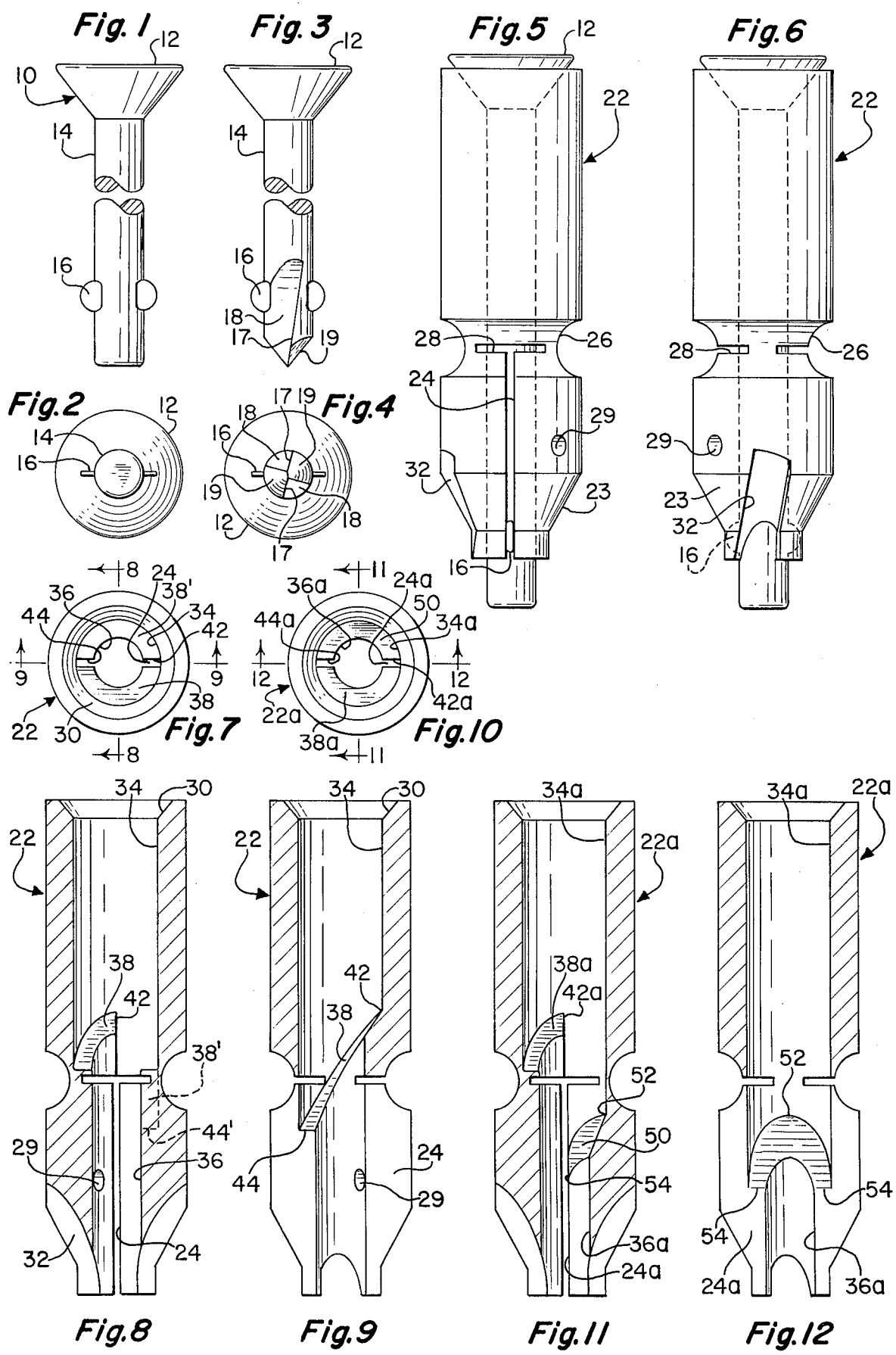

SCREW BLANK RECEIVING AND ORIENTING COLLET

BACKGROUND OF THE INVENTION

The present invention relates generally to a device for holding individual screw blanks during the feeding of the blanks into and out of work stations which deform the blanks in some manner, for example, the cutting of flutes or the like in the extremity of the shank to form a drill point.

The invention more particularly relates to a collet which holds a screw blank which has previously been provided with radially extending wings and wherein the flutes to be formed in the shank must be oriented relative to the wings.

Self-drilling screws, for example, of the type typical of that shown in U.S. Pat. No. 3,125,923 generally include a plurality of flutes formed at the tip of a screw blank to form cutting edges and chip exhaust means. Such screws are typically manufactured utilizing high speed, multi-station apparatus such as that shown in U.S. Pat. No. 3,280,412 wherein screw blanks are fed individually into collet devices which are circumferentially spaced about a dial and which are received and retained in a pluality of pockets on the dial. The pockets permit the selective removal of the collets so that the apparatus may accommodate different sizes of blanks. The dial rotates about an axis, selectively carrying the screw blanks into a plurality of circumferentially spaced work stations where the various sawing operations are accomplished to form a drill tip configuration on the extremities of the blanks. A typical apparatus may include rotation inducing means which serve to rotate the blanks about their axes so that the various deformations of the blank created by the cutting operations may be accurately located and oriented relative to each other as the blank passes through the various work stations.

The accuracy and orientation of the various cutting operations are essential to the provision of an effective drill point. When the screw blank has been provided with one or more radially extending reaming wings which are to be located within the longitudinal dimensions of the flutes, the blanks must be oriented and fixed in a particular orientation lest the sawing operation will remove or harm the wings. Typical prior art devices do not consider the orientation of the first flute cut in the blank but rather performs the first operation randomly as the blank is fed into the collet. This obviously is inappropriate and unacceptable when the blank has been subjected to a previous forming operation, such as the formation of wings which must be oriented relative to the flutes.

SUMMARY OF THE INVENTION

It is an object of the invention to provide a collet-type device to receive and orient screw blanks therein for accurately machining the point of the blank relative to wings on the blank.

It is a further object of the invention to provide a collet-type device for use in an automatic screw blank machine apparatus wherein a drill point may be formed on the screw blank without interfering or removing previously formed reaming wings on the blank.

A further more specific object of the invention is to provide a collet-type device having a through axial bore with a camming surface in the bore enabling a screw blank with radially extending wings to be automatically rotated to a predetermined orientation relative to flute cutting saws.

The present invention utilizes a collet-type device which may be incorporated in receiving pockets in a disc of the type generally found in machines such as that shown in U.S. Pat. No. 3,280,142. The collet of the invention will incude a through axial bore which has an upper diameter great enough to allow the free passage of a blank with radial wings formed thereon and a lower diameter which is of a dimension substantially equal to the diameter of the shank and thereby less than the radial dimension of the wings. Positioned intermediate and gradually merging the upper and lower diameters will be a camming surface, such as a helical shelf or an arc-like surface with a high point merging with the larger diameter portion and a low point merging with the smaller diameter portion. The lowermost extremity of the camming surface will intersect a slot extending axially and longitudinally of the collet. As the screw enters the collet, the wings will pass freely through the bore until they contact the camming surface. Thereafter, further axial insertion will cause the blank to rotate until the wings are aligned with the slots and are retained from further rotation therein. The wings thus essentially act as cam followers and the helical or arc-like ledge serve as cams rotating the cam followers until they are properly oriented within the collet. The screw blank can thereby be properly located and accurately and rigidly retained in the collet while the various sawing operations are performed on he extremity of the blank thus insuring an accurate drill point formation with the wings positioned intermediate the longitudinal extremities of the flutes of the drill point.

BRIEF DESCRIPTION OF THE DRAWINGS

FIG. 1 is a side elevational view of a screw blank prior to association with the collet of the present invention.

FIG. 2 is an end view of the blank shown in FIG. 1.

FIG. 3 is a side elevational view of the screw blank after the formation of the drill point thereon through association with the collet.

FIG. 4 is an end view of the blank shown in FIG. 3.

FIG. 5 is an enlarged side elevational view of a collet of the present invention and showing the blank associated therewith.

FIG. 6 is an enlarged side elevational view of the collet shown in FIG. 5 and rotated 90°.

FIG. 7 is a top plan view of the collet shown in FIG. 5.

FIG. 8 is a cross-sectional view of the collet of the present invention taken along lines 8—8 of FIG. 7.

FIG. 9 is a cross-sectional view of the collet of the present invention taken along the lines 9—9 of FIG. 7.

FIG. 10 is a top plan view of an alternate embodiment of the collet of the present invention.

FIG. 11 is a cross-sectional view of the alternate embodiment of the collet taken along the lines 11—11 of FIG. 10.

FIG. 12 is a cross-sectional view of the alternate embodiment of the collet taken along the lines 12—12 of FIG. 10.

DETAILED DESCRIPTION OF THE INVENTION

Turning first to FIGS. 1–4, the screw blank to be further configured with the aid of the collet of the present invention will be shown. The blank 10 shown in FIG. 1 will typically include an enlarged head 12 and an elongated shank 14 with radially extending wings 16 formed adjacent and relatively closely spaced from the end extremity of the blank. The blank shown in FIGS. 3 and 4 typifies the configuration resulting from a series of sawing or milling operations performed on the tip to produce a drill point on the blank. The blank shown in FIG. 3 may thereafter be subjected to a thread rolling process to produce a finished self-drilling and tapping threaded fastener.

A typical drill point configuration will include a pair of longitudinally extending flutes 18 and a pair of bevelled surfaces 19 intersecting the flutes and forming the cutting edges 17. In order to properly form a drill screw with the proper relief behind the cutting edges, the surfaces forming the flutes 18 and the bevelled surfaces 19 must be accurately oriented relative to one another.

It is frequently desirable to locate the reaming wings 16 at a position intermediate the uppermost and lowermost extremities of the flutes 18 so that the material being drilled may freely exhaust. This requires the blank to be positively oriented during the sawing operations. Collet 22 serves to automatically orient the screw blanks so that the milling cuts can be taken on the shank without harming the wings and thereby allowing the wings to be located in a position intermediate the extremities of the flutes.

The collet 22 will basically include a generally tubular body portion which will generally be a length greater than the length of shank 14 of the associated blank. The lowermost extremity of the body will include a generally frustoconical surface 23 which is adapted to be positioned in a mating pocket member in a rotating disc on the milling apparatus. This lowermost extremity of the body will include a longitudinally and axially extending through slot 24 which is adapted to receive or be aligned with the wings of the blank. A generally annular groove 26 may be formed intermediate the extremities of the body and partially, circumferentially extending slots 28 may be formed in this groove. The groove and slots may thus cooperate with camming surfaces in the collet pocket in the dial serving to clamp the blank as axial pressure is exerted on the blank. A seating surface 30 may be formed in the head portion of the collet and designed to receive a complementary head 12 on the fastener blank. In conjunction with the pocket in the disc, a hole or aperture 29 may be formed in the collet body. Such a hole permits the collet to be retained from relative rotation in the dial pocket through the use of a pin interconnecting the pocket and the body. It should be understood that the various structure and methods of retaining the collet in a pocket form no part of the present invention but the description thereof is included in this specification in order to clearly identify the environment in which the collet of the present invention functions.

To further facilitate the sawing or milling operation during formation of the flutes on the screw blank, longitudinally extending relief grooves 32 may be formed on the collet so as to permit the rotary saw blade to freely cut to the desired depth on the blank.

The through bore extending axially of the collet is identified as including upper and lower portions. The upper portion is of a greater diameter than the lower portion. The diameter of the upper bore 34 will generally be greater than the diameter defined by the radially extending wings 16 of a blank but less than the diameter defined by the head portion 12, while the diameter of the lower bore section 36 will be generally equal to the diameter of the shank 14 of the blank. An intermediate ledge portion is formed in the bore gradually interconnecting the upper bore 34 to the lower bore 36. In the preferred embodiment this intermediate section will take the form of a spiral cam ledge 36 having an uppermost extremity 42 merging with the larger bore 34 and a lowermost extremity 44 merging with the smaller bore 36. The lowermost extremity of the cam ledge 38 will generally intersect the longitudinal slot 24. Such a spiral ledge 38 will generally extend about 180° of the periphery of the bore. A similar but oppositely extending ledge 38′, with upper and lower extremities 42 and 44, respectively, may be formed on the opposite 180° periphery of the bore as shown in the primary embodiment FIGS. 8 and 9.

In operation, as a screw blank 10 is autometically inserted axially of the collet, the wings 16 will contact the spiral ledge 38 at some point between the uppermost extremity 42 and the lowermost extremity 44 depending upon the orientation of the blank as it is inserted in the collet. Whatever the orientation of the blank, the camming surface 38 serves to rotate the blank as it continues its axial insertion into the bore with the wings 16 serving as cam followers. The ultimate orientation of the blank regardless of its original orientation will be that of aligning the wings 16 with a longitudinally extending slot 24. With the wings extending into the slot, the blank is thus retained from further relative rotation within the collet and thereby permitting accurate machining operations to be performed on the tip, such as the formation of the drill tip shown in FIG. 3.

While the primary embodiment has been described as including a helical-type cam ledge extending from the upper, larger diameter of the bore to the lower, smaller diameter of the bore, it should be apparent that many alternate configurations of camming surfaces can be utilized to perform the function of rotating the blank as it is randomly inserted into the collet using the preformed wings 16 as a cam following means. For example, an arc-like transition surface tapering inwardly and downwardly from the uppermost section of the bore may be formed in the bore to serve a similar function to that of the helical cam surface 38. Such an arc-like surface is shown in collet 22a of FIGS. 10–12.

The arc-like camming surface 50 will present an upper or high point 52 and a pair of lowermost extremities 54 which generally intersect the slot 24a. It will be seen that the segments of the periphery of the bore between the uppermost extremity 52 and one of the lowermost extremities 54 will be generally 90° as opposed to the 180° extent of the helical cam. An arc-like cam, such as 50, may be further utilized in conjunction with a helical cam shelf 38a formed on the 180° peripheral extent of the bore opposing the peripheral extent of the surface 50. As a blank enters collet 22a, the wing will first contact the helical shelf 38a at a position intermediate points 42a and 44a. The extremity of the blankmay also contact surface 50 if the initial camming operation tends to cock or incline the blank from its longitudinal blank may The cooperation of the surface 50 with the extremity of the blank is such as to center and locate the blank within the smaller diameter 36a while the blank is rotated due to the action of the cam 38a and cam follower means formed on the blank.

Of course, it should be understood that the camming surfaces can comprise any combination of helical or arc-like surfaces and still achieve the desired results, such as pairs of arc-like surfaces or pairs of helical ledge surfaces or single surfaces in the bores of the collets.

The invention just described in the primary embodiment and various alternate embodiments will automatically orient blanks, with radially extending wings, in a tip forming apparatus so that the tip may be machine in positions intermediate the wings. The invention relies upon the sloping or camming surfaces formed internally in the bore to cooperate with the wings which serve as cam follower means so as to rotate the blank from an initial unoriented position to a final oriented position. In certain instances the wings may possibly initially contact the camming surfaces at the exact high point of the cams. In these situations, the vibrations of the machine will tend to dislodge the wings from this position and permit the blanks to be rotated in accordance with the invention.

Thus, it is apparent that there is now provided a collet for use in a screw blank processing machine that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A collet for receiving and orienting screw blanks with radial wings formed thereon and adapted to hold the blanks during a subsequent forming operation performed on the extremities of the blanks, comprising a tubular-like member with a through bore extending axially therein, the upper portion of the bore being of a first predetermined diameter which is greater than the diameter of the shank to e accommodated therein, the lower portion of the bore being of a second predetermined diameter which is less than said first predetermined diameter, a slot formed longitudinally of the tubular member from the lowermost extremity thereof upwardly through the second diameter portion and intersecting the central axis of the collet, a blank rotating cam surface means formed in the wall of the bore sloping downwardly from the first diameter portion to the second diameter portion along a predetermined segment of the periphery of the bore, the lowermost extremity of the cam surface means intersecting the slot, wherein the wings formed on the blank may abut the cam surface as the blank is inserted in the collet causing the blank to rotate until the wings are aligned with the slots in the lower portion of the collet.

2. A collet in accordance with claim 1, wherein the axial extent of the bore is less than the length of the shank to be accommodated therein.

3. A collet in accordance with claim 1, wherein the cam surface means includes a helical shelf extending from the first diameter portion to the second diameter portion of the bore.

4. A collet in accordance with claim 1, wherein the cam surface includes an arc-like transition surface tapering inwardly and downwardly from the first diameter portion to the second diameter portion, the uppermost point of the transition surface in the bore being intermediate a pair of lowermost extremities of said surface which also define the extremities of the predetermined segment of the periphery of the bore.

5. A collet in accordance with claim 4, wherein the predetermined segment of the periphery of the bore is approximately 180° and the segment of the periphery of the bore between the uppermost point and either lowermost point is approximately 90°.

6. A collet in accordance with claim 1, including a pair of cam surfaces on opposing surfaces of the bore.

7. A collet in accordance with claim 1, wherein the predetermined segment of the periphery of the bore between the uppermost extremity of the cam surface means and the lowermost extremity of the cam surface means is approximately 180°.

8. A collet in accordance with claim 3, wherein the cam surface means includes a pair of helical shelves on opposing 180° segments of the bore said shelves extending in opposite directions around the wall of the bore.

9. A collet in accordance with claim 1, wherein the cam surface means includes a helical shelf extending approximately 180° around the bore, the wall of the bore opposing the wall including the 180° helical ledge including a second cam surface means with the uppermost portion of the second cam surface located at generally the same axial location in the bore as the lowermost extremity of the helical shelf.

* * * * *